US008825739B2

(12) United States Patent
Canu et al.

(10) Patent No.: US 8,825,739 B2
(45) Date of Patent: Sep. 2, 2014

(54) METHOD AND APPARATUS FOR CONTROLLING MULTIPLE SYSTEMS IN A LOW BANDWIDTH ENVIRONMENT

(75) Inventors: Marco Canu, Rome (IT); Sandro Piccinini, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 12/166,356

(22) Filed: Jul. 2, 2008

(65) Prior Publication Data

US 2009/0013084 A1 Jan. 8, 2009

(30) Foreign Application Priority Data

Jul. 4, 2007 (EP) ..................................... 07111751

(51) Int. Cl.
*G06F 15/16* (2006.01)
*G06F 15/173* (2006.01)
(52) U.S. Cl.
USPC ............................ 709/203; 709/223; 709/224

(58) Field of Classification Search
USPC ............................................ 709/203, 223, 224
See application file for complete search history.

(56) References Cited

U.S. PATENT DOCUMENTS

| 6,735,691 | B1 * | 5/2004 | Capps et al. ....................... 713/1 |
| 6,912,522 | B2 * | 6/2005 | Edgar ................................ 707/2 |
| 7,024,474 | B2 * | 4/2006 | Clubb et al. ..................... 709/223 |
| 7,594,038 | B2 * | 9/2009 | Humphries et al. .............. 710/8 |
| 2006/0282855 | A1 | 12/2006 | Margulis |

* cited by examiner

*Primary Examiner* — Asghar Bilgrami
(74) *Attorney, Agent, or Firm* — Garg Law Firm, PLLC; Rakesh Garg; Jeffrey S. LaBaw

(57) ABSTRACT

A method of controlling one or more client systems by means of one or more server systems, comprising the steps of identifying a set of system control actions that occur as a result of carrying out a particular function on the server system, which function is required to be replicated on the one or more client systems; and sending the set of system control actions to any client system which is connected to the server system to configure the client system to carry out the system control actions and thereby causing the client system to carry out the particular function on the client system.

13 Claims, 2 Drawing Sheets

METHOD AND APPARATUS FOR CONTROLLING MULTIPLE SYSTEMS IN A LOW BANDWIDTH ENVIRONMENT

FIELD OF THE INVENTION

The present invention relates to a method and apparatus for controlling multiple systems in a low bandwidth environment, particularly but not exclusively, in relation to a testing environment.

BACKGROUND OF THE INVENTION

It is well known to broadcast or multicast information to multiple users in a computer related system. For example, during a business presentation a number of the audience may follow the speaker's slides at remote locations on individual computers. When the speaker changes slides all the audience that are at remote locations must try to follow the changes and carry them out themselves. This is particularly the case if the speaker changes the order in which the slides are presented often causes frustration to the audience.

In another example, a server operator may wish to test, update or otherwise poll remote computers connected to it. This may be to carry out tests, software updates or whatever. This is a time-consuming exercise if done on a one by one basis. This is particularly the case in respect of an operator working on a screen which is open in the remote computers and sending commands to the remote computers. There is no current means of doing this without broadcasting the whole of the screen on both the server and the remote computer in order that commands, such as mouse click etc. can be accurately identified. This generally means that the whole screen content including the commands moves from the server to the remote computer or vice versa. This requires a significant amount of bandwidth between the server and the remote computer for perhaps just a very simple test.

There are products, such as Windows Remote Desktop Connection and virtual network computing (VNC) which allow a user to remotely access the system in order to see the system screen on multiple systems. These systems have the same disadvantages as identified above, i.e. transmission of the whole screen content is required to effect the necessary control function.

US 2006/0282855 (assignee: Digital Display Innovations, LLC.) discloses a multiple remote display system which includes a host system that supports both graphic and video-based frames. For each display and for each frame, a multi-display processor manages the necessary aspects of the remote display frames. The necessary portions are further processed, encoded and when necessary transmitted over a network to the remote display of each user. In certain embodiments the host system manages a remote desktop protocol and can transmit encoded video or frames at the same time. This is a complicated system and method which requires a high level of bandwidth as the remote displays receive the whole frame or video along with the remote desktop protocol signal.

One object of the present invention is to provide a method or system which solves at least some of the problems associated with the prior art.

Another object of the present invention is to provide a method, apparatus, and computer program embodied in non-transitory machine readable medium for controlling multiple systems on which the same operation is repeated for different remote computers or end-users, without broadcasting the host screen content.

SUMMARY OF THE INVENTION

The present invention is directed to the method and system as defined in the independent claims.

More particularly, the present invention discloses a method of controlling one or more client systems by means of one or more server systems, comprising the steps of identifying a set of system control actions that occur as a result of carrying out a particular function on the server system, which function is required to be replicated on the one or more client systems and sending the set of system control actions to any client system which is connected to the server system to configure the client system to carry out the control actions and thereby causing the client system to carry out the particular function on the client system.

Further embodiments of the invention are provided in the appended dependent claims.

An important element of the present invention is the fact that not all the information at the server is collected and sent to the clients. Instead, a small low bandwidth subset of the information at the server is collected and sent to the clients. One advantage of this is a reduction in the amount of information sent between server and client. In addition, another advantage is that the server can simultaneously run tests (for example) on a number of different client machines. A multi-protocol server allows this to be done with multiple different processes as well as different clients. This is yet another advantage of the present invention.

BRIEF DESCRIPTION OF THE DRAWINGS

Reference will now be made, by way of example, to the accompanying drawings, in which.

DETAILED DESCRIPTION OF THE PRESENT INVENTION

Figure 1:
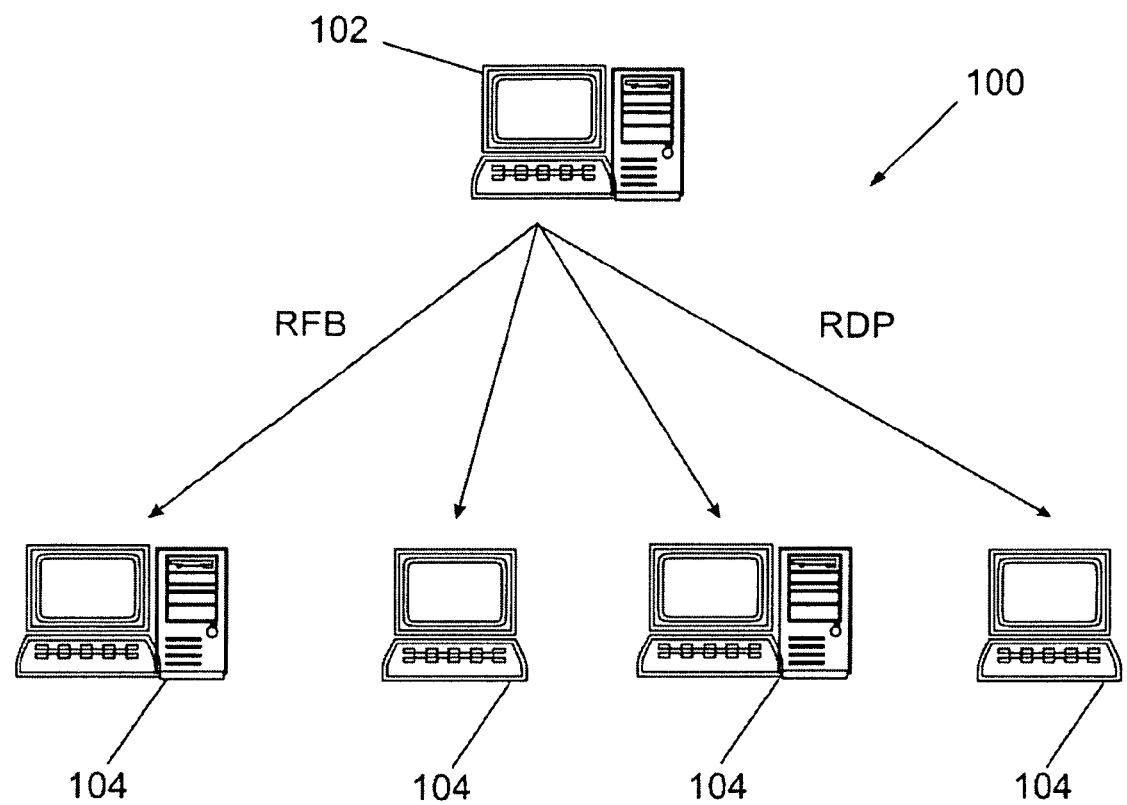
FIG. 1 is a simple diagram for showing the system for controlling multiple systems in the low bandwidth environment, in accordance with an embodiment of the present invention.

Referring initially to FIG. 1 a diagram of a system for controlling multiple systems 100, in a low bandwidth environment, is shown. The system comprises a server 102 connected to a number of clients 104 by means of any appropriate connection, for example a wire line or wireless connection. In a different manner than is known in the prior art, the server collects and gathers information relating to operation system events. These may be in the form of keyboard entries, mouse events or any other system command or control action howsoever generated. The collected and gathered events are then redistributed to the various different clients by means of the connection in order to replicate the function carried out by the system commands. It is not necessary to broadcast the host screen content. Since the keystrokes and mouse clicks are relatively small in terms of bandwidth the amount of information transmitted from the server to the client is significantly reduced from that which would be the case in the prior art.

The manner in which the operating system events are collected and gathered will now be described in greater detail. A server application running on the server collects all the system events carried out on the server with respect to those which are required for redistribution or replication. The application running on the server, may be in the form of a daemon configured to capture the operating system events as they occur and store them prior to transmission to the client. For example, the daemon may capture the position of the cursor on the screen when the mouse is clicked or when the keyboard is touched. The combination of position on the screen and action carried out constitutes the operating system event that can be replicated on the client. A daemon is one example of how this may be implemented, but it will be appreciated there are many others. If necessary, the daemon can store the operating system events for a predetermined time before sending a multicast of the clients including the operating system events for replication.

The set of operating system events which are required will vary for different activities or operations. For example, with respect to a testing environment the system events may relate to the manner in which a test can be repeated on multiple client systems without the need to repeat user operations for each of the individual client systems. The ability to control multiple clients in this effective manner allows parallel operation of the testing and thus improvements in efficiency for the user. This is particularly the case when using the same operating system, but with the need to test multiple different versions (builds or releases) of the products having the same interface on multiple levels. This is the case even if the products have different runtime configurations on each system. Alternatively the same advantages are present using the same product on operating systems having differing fix pack levels or when applying a patch.

The fact that the operating system events comprise relatively small amounts of information, means that a low bandwidth is required to multicast these events to any client connected to the server system. This has many advantages for the server operator, including: reductions in the cost, effort, and band width requirements and user workload levels; and increases in efficiency and ease of use for the users of both the client and server.

The system events can be collected based on a number of different remote access protocols. One possible protocol is known as remote frame buffer (RFP) protocol and is a simple protocol for remote access to graphical user interfaces. As it works at the frame buffer level it is applicable to most operating systems and applications. RFB is the protocol used in Virtual Network Computing (VNC). An alternative protocol is the remote desktop protocol (RDP) which is a protocol used to implement remote desktop applications. These methods operate at the server side of the architecture and do not require any changes to the equipment at the client side of the architecture. The effect of these types of protocol is to "wrap" the system events in the specific protocol prior to transmitting them to the client.

Irrespective of the protocol adopted, at the client side, the system events are integrated with client elements (applications, systems or whatever) in order to carry out the required step or steps, remotely at the client location. For example, the steps for a particular test or update are sent to the client and implemented on the client side by the appropriate application or system. For example, the screen is configured in the same way as the server and with the same "look and feel". Any mouse or key board events are positioned as required by the system events and then carried out also in accordance therewith.

Another possibility is to build a slim client side architecture which is capable of implementing some basic configuration functions. These basic configuration functions include the exchange of information between the server and client as the case may be. The information may include data relating to resolution of the client, refresh times, etc. It will be appreciated that any basic configuration functions may be exchanged in either direction.

With regard to the client side of the architecture each client may have a common environment with common properties to all other clients connected to the server. The same machine architecture, operating system and application system may be required on each client. However, if this were not the case the server could build and push the necessary desktop profiles to the client before commencing the test. This may be limited to a subset of the architecture, system and software required for the purposes of the test. In order to push desktop profiles it may be necessary to change the screen resolution, icon configuration and appearance theme of the client machine. This may be necessary in order to achieve graphic homogeneity and guarantee client side applications behave in a similar manner as the server on which the commands originated. The required profiles can be created, imported or pushed as required for the application in question.

It may be necessary to align the clients with each other and implement an optional synchronisation process to enable clients to receive the server configuration file with common configuration information (e.g. Desktop resolution, refresh time etc.). The server may also adapt the profile for use for a particular application execution for any client that is connected to the server at a given time.

The server may implement a multi-protocol implementation to enable different client side applications be controlled by the server at the same time. For example one set of clients may require a first client side application, whilst a second set of clients may require a second client side application. This can be implemented by means of a multi-protocol server.

The state of the art remote desktop applications and point to point architectures only allow single connections at a given time. By comparison the present invention extends the architecture to a point to multi-point architecture that can distribute commands from the server, to any connected clients, by means of a multicast communication.

Figure 2:
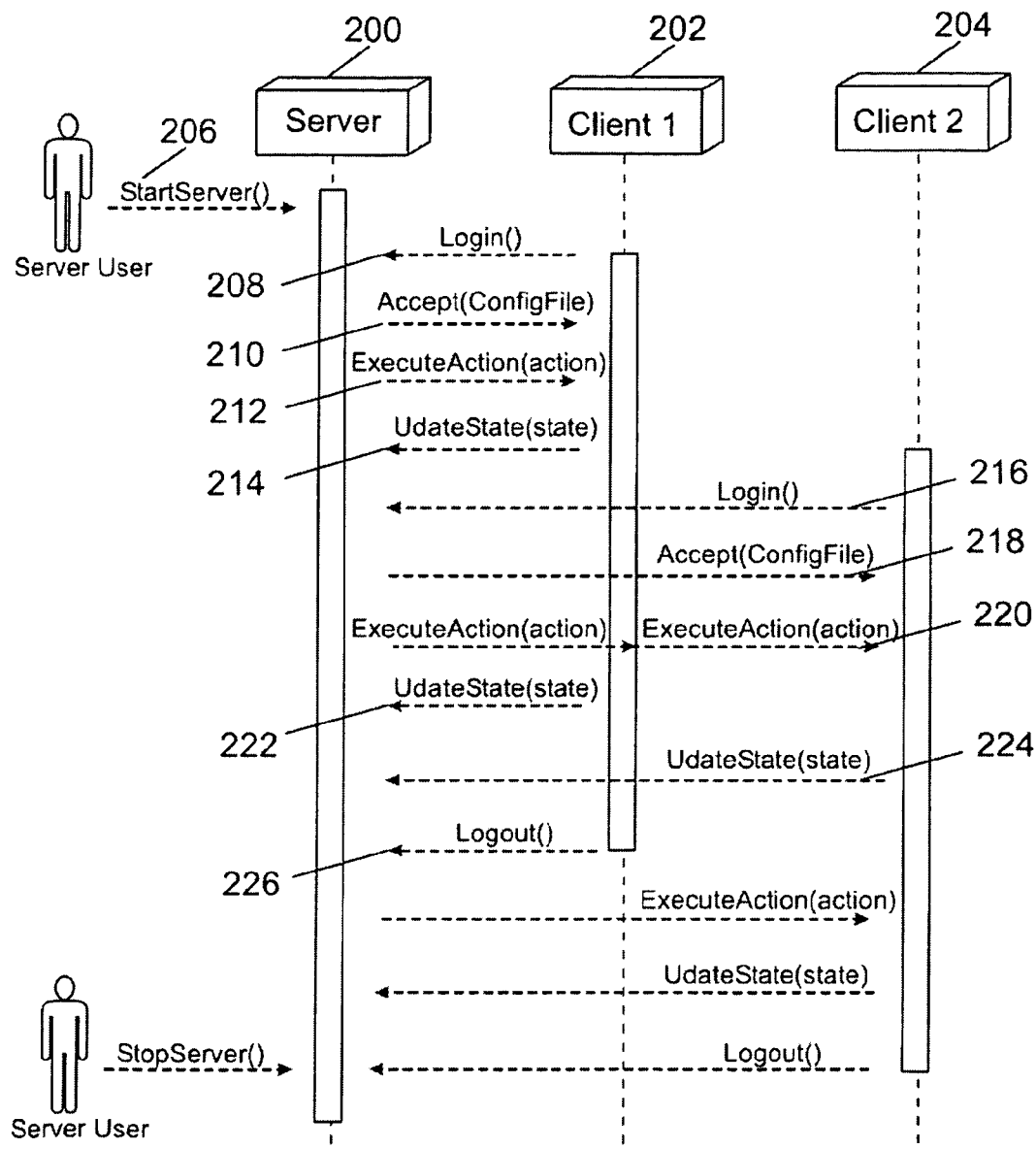
FIG. 2 is a signal diagram for demonstrating the method steps for controlling multiple systems in a low bandwidth environment, in accordance with an embodiment of the present invention.

The method steps of the present invention will now be described with reference to FIG. 2. FIG. 2 shows the details of the communications between a server 200, a first client 202 and a second client 204. The server is operated by a server user and is started by means of a start server action 206. At a certain point in time client 1 logs in to the server 202 (step 208). The server replies with an accept configuration message which includes any necessary configuration information for the client (step 210). The client applies the configuration and is then in a position to accept instructions from the server in relation to server updates. At a certain point in time the server sends an execute action message (step 212). This is in the form of an update message that is sent to all connected clients at the time of the update. The client executes or performs the required action and sends an update message to the server indicating that the action has been performed and the client status has changed (step 214). The executed action message includes the commands required to carry out the test, or whatever, that is to be replicated at each client connected to the server.

Client 2 connectors to the server in a similar manner with a log in request from the client (step 216) and the configuration message from the server to configure client 2 in the required manner (step 218). Any further execute action message from the server is then sent simultaneously in a multicast communication to both client 1 and client 2 (step 220). Client 1 executes the required action and sends an update message to the server indicating that the action has been performed and the client status has changed (step 222). Similarly, client 2 does the same (step 224).

At any appropriate time the client may log out of the system by means of a log out message (step 226, for example). Any subsequently generated execute action messages from the server will not be sent to the clients that have already logged out but only to those that are still connected as is shown in steps 228 and 230.

Connection may be terminated by the client as indicated above by means of a message alerting the server to terminate the connection. Connection can also be closed from the server side, for example the server may close down the connection after an predetermined time-out has passed.

The client may optionally operate in a so-called "sandbox environment". A sandbox is a set of rules that are used when creating an applet that may prevent certain functions when the applet is sent as part of a Web page. The sandbox creates an environment in which there are strict limitations on what system resources the applet can request or access. Sandboxes are used when executable code comes from unknown or "untrusted" sources and to allow the user to run "untrusted" code safely, if required.

The present description has shown an example of a method and apparatus for a server controlling a multiplicity of client machines. It will be appreciated that the method and apparatus can be used in any system where there is one or more first entities (for example a server) controlling a plurality of second entities (for example the clients). An important element of the present invention is the fact that not all the information at the server is collected and sent to the clients. Instead a small low bandwidth subset of the information at the server is collected and sent to the clients. One advantage of this is a reduction in the amount of information sent between server and client. In addition, another advantage is that the server can simultaneously run tests (for example) on a number of different client machines. A multi-protocol server allows this to be done with multiple different processes as well as different clients. This is yet another advantage of the present invention.

A further embodiment of present invention deals with the fact that during the configuration or registration phase each system can indicate which subset of operating system events it is interested in receiving. For example, a specific client can indicate it wants to receive only keyboard events or mouse events or one or more specific application events. Having indicated that only certain operating system events will be accepted, other operating system events may not be acted upon by the client. However, in certain circumstances the server may override the client for purposes that the client cannot foresee when setting up the restriction.

In a still further aspect of the invention, a daemon on the client can be "listening" for a server call so that the registration and configuration is triggered by the server. This will initiate the server to broadcast or multicast a message for the start of a new session to any client from which a reply to the call has been received. In this case, therefore, instead of the client deciding to log in to the server system, it is a daemon on client system that does this.

While the invention has been particularly shown and described with reference to a preferred embodiment, it will be understood that various changes in form and detail may be made therein without departing from the spirit, and scope of the invention

The invention claimed is:

1. A method of controlling one or more client systems by means of one or more server systems, comprising:

identifying a set of system control actions that occur as a result of carrying out a particular function on the server system, which function is required to be replicated on the one or more client systems; and sending the set of system control actions to any client system which is connected to the server system to configure the client system to carry out the system control actions and thereby causing the client system to carry out the particular function on the client system.

2. The method of claim 1, further comprising incorporating the set of system control actions into a remote access protocol message transmitted from the server system to the client system.

3. The method of claim 1, further comprising sending configuration information to the client system in response to the client system logging onto the server system, to configure the client system to accept the set of system control actions.

4. The method of claim 1, further comprising receiving an update message from any connected client system to confirm the particular function has been carried out.

5. The method of claim 1, further comprising sending the set of system control actions in a multicast communication to all connected client systems.

6. The method of claim 1, further comprising sending the set of system control actions in order to carry out the test operation.

7. The method of claim 1, further comprising implementing a synchronisation process for all connected client systems so as to ensure that all connected client systems are in the same configuration state.

8. The method of claim 1, further comprising running a daemon on the server system, in order to capture the system control actions for replication at the client system.

9. The method of claim 1, further comprising sending a subset of the system control actions captured at the server system to the client system, dependent on a predetermined profile of said client system.

10. A method of enabling the control of a client systems by one or more server systems, comprising:

connecting to a server system;

receiving a set of system control actions from the server system to configure the client system to carry out the system control actions and thereby causing the client system to carry out a particular function on the client system, which function is a function on the server system and is required to be replicated on the client system; and sending an acknowledgement to the server system that the function has been carried out to thereby update the status of the client system at the server system.

11. The method of claim 10, further comprising receiving a set of system control actions which is a subset of the system control actions carried out on the server system.

12. A server system for controlling one or more client systems comprising processor, memory and computed instructions for carrying out the steps of a method comprising:

identifying a set of system control actions that occur as a result of carrying out a particular function on the server system, which function is required to be replicated on the one or more client systems; and sending the set of system control actions to any client system which is connected to the server system to configure the client system to carry out the system control actions and thereby causing the client system to carry out the particular function on the client system.

13. A computer program in a non-transitory machine readable medium for controlling one or more client systems comprising instructions for carrying out a method when said computer program is executed on a computer system, comprising:
   identifying a set of system control actions that occur as a result of carrying out a particular function on the server system, which function is required to be replicated on the one or more client systems; and
   sending the set of system control actions to any client system which is connected to the server system to configure the client system to carry out the system control actions and thereby causing the client system to carry out the particular function on the client system.

* * * * *